(12) United States Patent
Lipton et al.

US009727373B2

(10) Patent No.: US 9,727,373 B2
(45) Date of Patent: Aug. 8, 2017

(54) PROVIDING RESUMPTION DATA IN A DISTRIBUTED PROCESSING SYSTEM

(75) Inventors: Daniel Lipton, Belmont, CA (US); Vladimir Lhotak, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1326 days.

(21) Appl. No.: 12/057,237

(22) Filed: Mar. 27, 2008

(65) Prior Publication Data

US 2009/0248754 A1 Oct. 1, 2009

(51) Int. Cl.
| | | |
|---|---|---|
| *G06F 17/30* | (2006.01) | |
| *G06F 7/00* | (2006.01) | |
| *G06F 9/48* | (2006.01) | |
| *G06F 9/50* | (2006.01) | |
| *G06F 11/34* | (2006.01) | |

(52) U.S. Cl.
CPC ............ *G06F 9/485* (2013.01); *G06F 9/5072* (2013.01); *G06F 11/3433* (2013.01)

(58) Field of Classification Search
CPC .................................................... G06F 9/485
USPC ............. 707/999.202, 722; 718/102; 714/20; 709/220
See application file for complete search history.

(56) References Cited

U.S. PATENT DOCUMENTS

| | | | | |
|---|---|---|---|---|
| 6,553,419 B1* | 4/2003 | Ram ................... | G06F 11/3476 | |
| | | | 709/224 | |
| 7,225,445 B1* | 5/2007 | Kobayashi ............ | G06F 3/1208 | |
| | | | 358/1.9 | |
| 7,401,194 B2* | 7/2008 | Jewell ........................... 711/162 | | |
| 7,493,337 B2* | 2/2009 | Chaudhuri ........ | G06F 17/30306 | |
| 7,495,791 B2* | 2/2009 | Kovnat et al. ............... 358/1.15 | | |
| 7,619,761 B2* | 11/2009 | Bankston et al. ........... 358/1.14 | | |
| 7,630,092 B1* | 12/2009 | Suzuki et al. ............... 358/1.14 | | |
| 7,756,919 B1* | 7/2010 | Dean ................. | G06F 17/30445 | |
| | | | 709/201 | |
| 2002/0143850 A1* | 10/2002 | Caronni ................. | G06F 9/505 | |
| | | | 709/201 | |
| 2003/0028645 A1* | 2/2003 | Romagnoli .................... 709/226 | | |
| 2004/0196496 A1* | 10/2004 | Klassen ...................... 358/1.15 | | |

(Continued)

OTHER PUBLICATIONS

Apple Inc., "System Services", Apple Computer Inc., dated Nov. 12, 2002, 30 pages.

(Continued)

*Primary Examiner* — Kuen Lu
(74) *Attorney, Agent, or Firm* — Nicholas Panno; Page Ponsford; DLA Piper LLP US

(57) ABSTRACT

An approach for providing a user with resumption data before pausing or terminating a partially-processed job that is processing in a distributed system. Certain applications, when paused, are not able to resume processing data at precisely the point where it was paused. As a result, users surrender some, or all, of the processed portion of the data when processing is paused. In one embodiment of the invention, a user is provided with resumption data before the user confirms a request to pause the processing. Resumption data from each of the service nodes that is processing a segment of source data are collected and aggregated. Resumption data reflects a measure of processed data that would require re-processing if the processing were paused and resumed. Alternatively, resumption data includes a duration of spent processing time that would be lost if the processing were paused and resumed.

57 Claims, 6 Drawing Sheets

(56) References Cited

U.S. PATENT DOCUMENTS

| | | | |
|---|---|---|---|
| 2004/0223176 A1* | 11/2004 | Ueda | 358/1.13 |
| 2004/0250249 A1* | 12/2004 | Fukunari et al. | 718/100 |
| 2006/0048155 A1* | 3/2006 | Wu et al. | 718/101 |
| 2006/0075079 A1* | 4/2006 | Powers et al. | 709/220 |
| 2006/0080389 A1* | 4/2006 | Powers et al. | 709/203 |
| 2006/0195508 A1* | 8/2006 | Bernardin et al. | 709/203 |
| 2007/0101331 A1* | 5/2007 | Krebs | 718/101 |
| 2007/0234363 A1* | 10/2007 | Ferrandiz | 718/101 |
| 2008/0276239 A1* | 11/2008 | Collins | G06F 11/1471 718/101 |
| 2008/0307258 A1* | 12/2008 | Challenger et al. | 714/20 |

OTHER PUBLICATIONS

Apple Inc., "Apple Qmaster 3", User Manual, Apple Inc., 2007, 34 pages.

Apple Inc., "Batch Monitor User Manual", Apple Computer Inc., 2005, 10 pages.

Apple Inc., "Apple Qmaster 3 and Compressor 3", Distributed Processing Setup, Apple Computer Inc., 2007, 86 pages.

Apple Inc., "Compressor 2", User Manual, Apple Computer Inc., 2005, 263 pages.

\* cited by examiner

PROVIDING RESUMPTION DATA IN A DISTRIBUTED PROCESSING SYSTEM

FIELD OF THE INVENTION

The subject matter of the claimed invention generally relates to distributed processing systems, and more particularly to providing resumption data for computing jobs that are processed in a distributed processing system.

BACKGROUND OF THE INVENTION

Computing jobs can be processed simultaneously on several processors in a distributed processing system. Distributing the processing load of a computing job among several processors results in a shorter processing time for the computing job than if the computing job were processed on fewer processors. Typically, a computing job is divided into segments, and each of the segments is processed separately. The segments may be processed by different processors running on different machines.

Reasons vary for pausing computing jobs and resuming the jobs at a later time. For example, some computing jobs require lengthy processing time to complete, even when processed in a distributed processing system. Pausing a computing job would free up computational resources for processing other jobs with higher priorities. Some computing jobs are paused because they are running on machines which need to be taken offline. Other computing jobs are paused so that they can be resumed on machines with faster processors.

For certain applications, it may not be possible to pause a computing job and to resume the job at precisely the point at which the job was paused. The extent to which a paused computing job can be resumed without losing any work depends on the nature of each individual client application running on the distributed processing system. While some applications can pause and resume a distributed computing job without losing any work, other applications require a full restarting of a whole computer job. Still other applications lose only the work from partially-processed segments, while not losing any work on segments that have been fully-processed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE INVENTION

In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Architectural Overview

Figure 1:
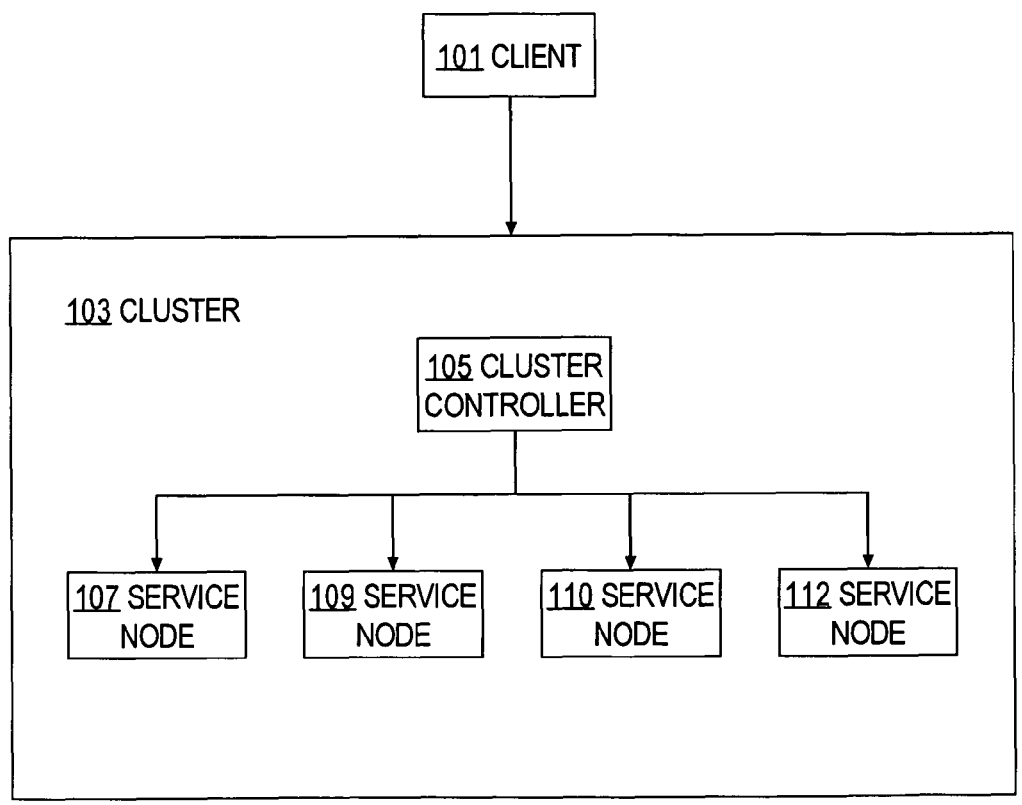
FIG. 1 is a block diagram illustrating one example of a distributed computing environment upon which one embodiment of the present invention is implemented.

Distributing the processing load of a computing job among multiple computers can result in greater processing speed and productivity than processing the computing job on one computer alone. FIG. 1 is a block diagram illustrating one example of a distributed computing environment upon which one embodiment of the present invention is implemented. Client 101 submits computing jobs to cluster 103 for distributed processing. It is possible for one or more clients to submit computing jobs to cluster 103 for distributed processing.

Some examples set forth herein are given in a context in which the computing jobs that are submitted for distributed processing are processing tasks that include commands that identify (a) a location where source data can be found, (b) an application to use for processing the source data, (c) a destination location for storing the processed data, and (d) settings to be provided to the application. The source may be a file, or other data source. However, the techniques described herein are not limited to any particular context, nor to any particular type of computing jobs.

In the embodiment illustrated in FIG. 1, multiple jobs can be submitted as a batch to cluster 103. According to one embodiment of the invention, computing jobs are always submitted as part of a batch, whereby a batch comprises as few as just one job.

Cluster 103 comprises cluster controller 105, and service nodes 107-112. Cluster controller 105 manages the computing jobs that are submitted to it by client 101, or by other clients that belong to the same network as cluster 103. For example, cluster controller 105 divides a computing job into a plurality of segments, and distributes the segments to one or more available service nodes 107-112 for processing.

According to one embodiment, each segment includes (a) a command that identifies which portion of the computing job's source data is to be processed, (b) an application to use for processing the segment, (c) a destination location for storing the processed data, and (d) settings to be provided to the application. Cluster controller 105 identifies which of service nodes 107-112 is providing the application required by the computing job, and distributes segments to one or more of service nodes 107-112 according to the availability of the services nodes. As processing is completed, the processed segments are reassembled into a destination target for client 101.

Figure 2:
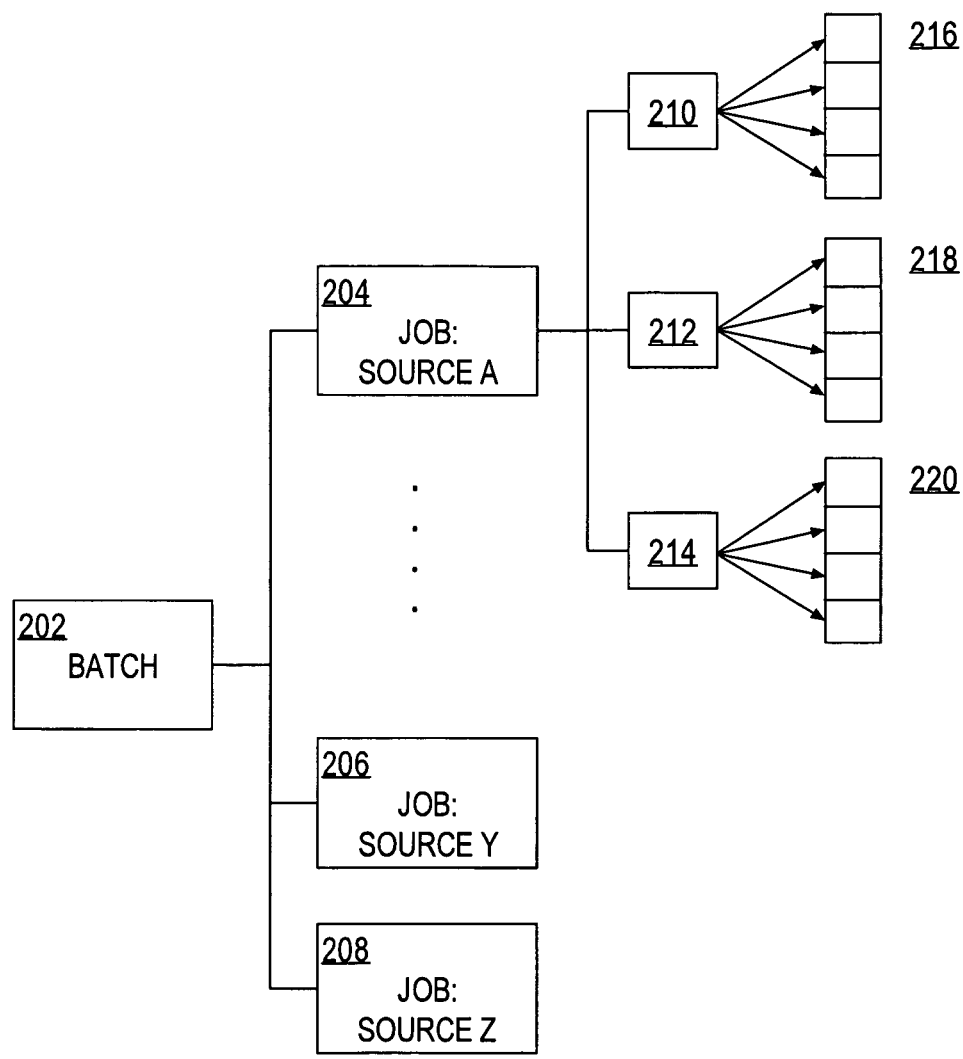
FIG. 2 is a block diagram illustrating the hierarchy of a batch of work that is being processed in the distributed computing environment, in one embodiment of the invention.

FIG. 2 is a block diagram illustrating the hierarchy of a batch of work that is being processed in the distributed computing environment, in one embodiment of the invention. The distributed computing environment in which the distributed processing system is implemented comprises a set of computing elements that are interconnected via a network, or via multiple interconnected networks. According to the embodiment, a user submits batch 202 to cluster 103 for processing. Batch 202 has at least jobs 204-208, where each job is associated with its particular source file A, Y, and Z, respectively. Each source file can be processed differently, for example, by using different encoding methods or applications, to produce different results. For example, consider a scenario in which video is being encoded. In such a scenario, a source file may be compressed by one process to generate processed data that is in an MPEG-2 format, and the same source file may be additionally compressed by a second process to generate processed data that is in an MPEG-4 format. The resulting two sets of processed data in the MPEG-2 and MPEG-4 formats are generally referred to as the "targets" for the job that is associated with the source file. For example, referring to FIG. 2, computing job 204's Source A produces targets 210-214.

For each target 210, 212, and 214 of a job, the source data is divided into multiple segments 216, 218, and 220, respectively, for processing. In one embodiment of the invention, source data is submitted for conversion from Digital Video (DV) to MPEG-2, and also MPEG-4. One target is generated for the MPEG-2 conversion, and a second target is generated for the MPEG-4 conversion. For each of the targets respectively, the source data is divided into segments by cluster controller 105 for processing. Each segment spans a certain portion of the source data (e.g. Seg1=Frame1::Frame10; Seg2=Frame11::Frame20; et seq.) Each of the segments is assigned to one of the plurality of service nodes for processing. Some service nodes may be assigned different quantities of segments than other service nodes, depending on their respective processing availability and processing capacity.

One computer may serve two distributed processing roles. For example, client 101 can be configured to also act as cluster controller 105. Other examples include a client that can also be enabled as a service node, and a service node that can also be enabled as cluster controller. Additionally, each processor of a computer with two or more processors can be enabled as a separate service node. Typically, a cluster can only have one cluster controller.

According to one embodiment, one or more of the service nodes 107-112 is executing a frame-based rendering application, for example, Apple, Inc.'s Shake® application, or Autodesk, Inc.'s Maya® application. According to another embodiment, one or more of the service nodes 107-112 is executing one of a variety of applications required by one of more computing jobs that are submitted to cluster 103.

According to one embodiment, certain disk volumes on the one or more of the plurality of computers that comprise cluster 103 are enabled as cluster storage. All files and data written to cluster storage are accessible by all components of the cluster. For example, cluster storage is accessible to cluster controller 105 and to service nodes 107-112 for storing and retrieving data, such as source data, processed data, job submission data, and destination data.

Figure 3:
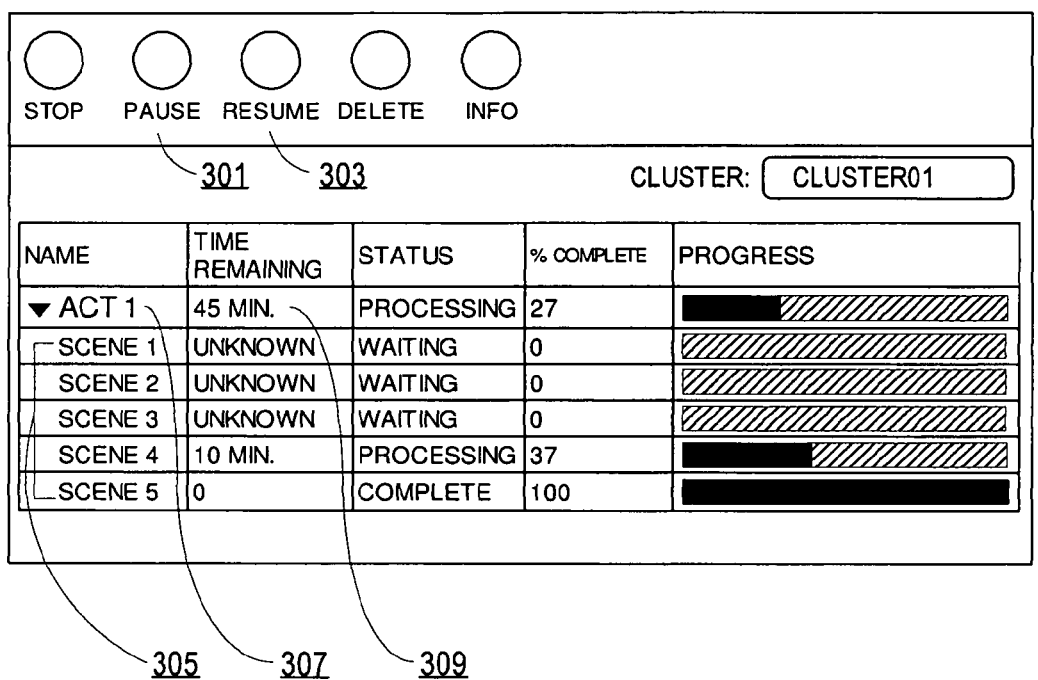
FIG. 3 is a diagram illustrating a graphical user interface for a batch monitor according to one embodiment of the invention.

A variety of applications and utilities provides configuring, monitoring, and managing services for client 101 and cluster 103. Each computer that is on the same network as cluster 103 can run an administration application for administering cluster 103. One example of an administration application is batch monitor 300, as illustrated in FIG. 3. According to one embodiment, batch monitor 300 can be executed and used by either a user or an administrator. The features offered by batch monitor 300 are not limited to those discussed in the following examples, and may include additional features such as displaying detailed status information, a history table of past jobs, password protection, and various other settings.

In the particular embodiment, batch monitor 300 features a plurality of buttons that may be used to control the processing of a particular job or a batch of jobs. For example, batch monitor 300 has the buttons Pause 301 and Resume 303 that, respectively, cause the cluster controller to execute procedures to pause or resume a particular job or a batch of jobs.

Batch monitor 300 also features progress information relating to each job, including time remaining, status, percent complete, and a progress bar. Batch 307 consists of jobs 305. Time 309 reflects the estimated time remaining until the completion of processing for batch 307. Batch time remaining is derived from the processing statistics collected so far for all completed portions of the batch. For example, time 309 is calculated based in part on the aggregated processing rates of job "Scene 4" and job "Scene 5 " of batch 307. The reporting and collecting of processing statistics are discussed in further detail below.

Providing Resumption Data in a Distributed Processing System

Figure 4:
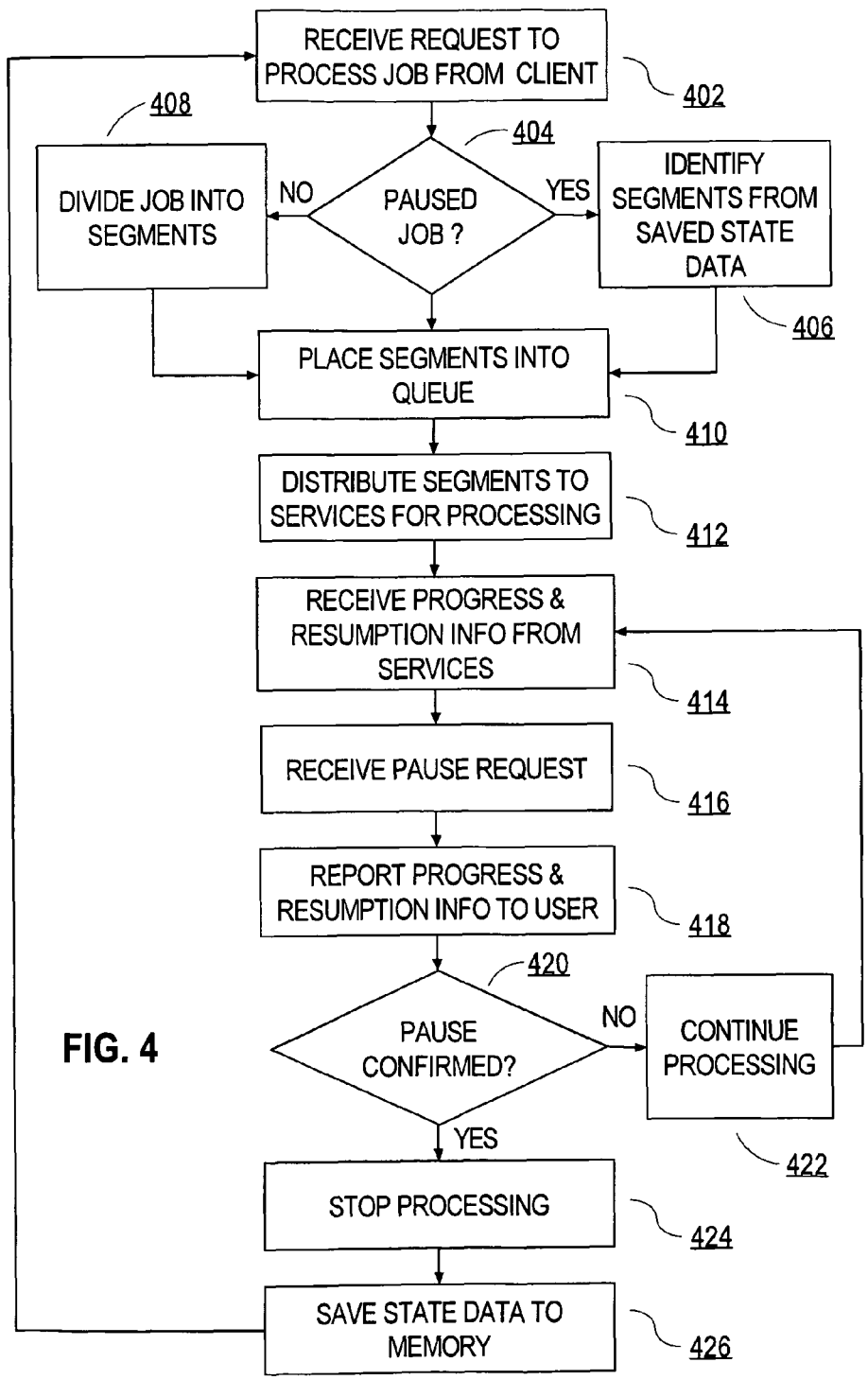
FIG. 4 is a flow diagram that illustrates steps executed by one or more components of the distributing computing environment according to one embodiment of the present invention.

FIG. 4 is a flow diagram that illustrates one embodiment of the present invention. At step 402, cluster controller 105 receives a job request from client 101. According to one embodiment, at step 404, cluster controller 105 determines if the job request is a new batch submission, or if the request is a request to resume a previously-paused job. At step 406, if the job request is to resume a previously-paused job, cluster controller 105 identifies the paused segments and associated data files that stores the state of the paused job or batch of jobs. At step 408, if the job request is a new batch submission, the jobs are divided into segments according to the current cluster architecture. According to one embodiment of the invention, if there are three service nodes in cluster 103, then jobs are divided into six segments, where two of the segments are distributed to each of the three service nodes for processing in parallel.

According to one embodiment, at step 406, when a job is resumed, cluster controller 105 also re-assesses the architecture of cluster 103 for any changes since the job was paused. If the architecture were changed, such as with the addition or removal of service nodes, cluster controller 105 may further subdivide the unprocessed portions of the segments into separate smaller segments to take full advantage of the new cluster architecture. For example, if there were previously three service nodes available to process a job that consists of three segments, and four service nodes are currently available to process the paused job, one of the three segments can be divided into two smaller segments so that the additional service node may be used upon resuming the job. According to one embodiment, a job is paused expressly to take advantage of any changes in cluster architecture.

At step 410, the segments, both new and paused, are placed into a queue in cluster controller 105, where the segments "wait" to be processed by a service node.

At step 412, the segments are distributed to the appropriate service nodes for processing. According to one embodiment, each segment is associated with a work demand weight that reflects the resources required for processing the particular segment. In addition, each service node is associated with a performance score that reflects the processing speed and capacity of the particular service node. According to one embodiment, the segments with the highest work demand weights are distributed to the service nodes with the highest performance scores.

At step 414, cluster controller 105 periodically receives progress and resumption data from service nodes 107-112 regarding each of the segments being processed. According to one embodiment, cluster controller 105 periodically polls service nodes 107-112 for progress and resumption data. According to one embodiment, cluster controller 105 aggregates information that is collected from service nodes 107-112 to form progress and resumption data about individual computing jobs and batches. According to one embodiment, the information is displayed on batch monitor 300. According to another embodiment, the resumption data is displayed only in response to cluster controller 105 receiving a request to pause a job or a batch.

At step 416, cluster controller 105 receives a request to pause a job or a batch. According to one embodiment of the invention, a user pauses a computing job by submitting a pause request to cluster controller 105 through pressing Pause 301 from batch monitor 300. According to another embodiment, a user pauses a computing job by submitting a pause request through a client application executing on client 101. At step 418, based on the resumption data collected from service nodes 107-112 at step 414, aggregated resumption data for the job or the batch and a request for a confirmation of the pause request are presented to the user. According to one embodiment, the resumption data includes information regarding how much completed work, or how much spent time, would be lost if the job is paused, then resumed. At step 420, if the user confirms the pause request, the cluster controller 105 forwards the pause request to one or more of service nodes 107-112, and at step 424, all service nodes terminate the processing of the segments of the paused job. At step 426, each of the service nodes that was processing the job to be paused saves a state file to cluster storage according to procedures provided by the particular application used to process the paused job, and reports the status of the currently-processed segment to cluster controller 105. According to one embodiment, certain applications enable saving the state of a partially-processed segment, such that processing of the segment can be resumed at the same place where the processing was terminated. Some applications require that any partially-processed segments be aborted and re-processed upon resuming the job. Other applications do not enable any pausing, and require that the whole job be re-processed upon resuming the job. According to one embodiment of the invention, the differences in the ability of certain applications to save the state of a partially-processed jobs accounts for the difference in the ability for a job to be paused without losing any work.

According to one embodiment, cluster controller 105 maintains a data structure which includes the processing status of all segments of a job, including the location of the state files for partially-processed segments. In one embodiment, the data structure comprises files written in eXtensible Markup Language (XML), otherwise known as XML documents. In the embodiment, the data structure may store the partially-processed data of the segments as binary large objects (BLOBs) within the XML data structure.

At step 422, if the user does not confirm the pause request, service nodes 107-112 continue processing the job.

According to one embodiment, the pause request at step 416 is a request to pause work at any of the target, job, or batch levels. Thus, the resumption data includes data regarding how a target, job, or batch would be resumed if any of the targets, jobs, or batches were paused. According to one embodiment, the resumption data includes information regarding whether the target, job, or batch can be resumed at the point where it was paused, and if not, how much work would be lost if it were to be paused and resumed. In the embodiment, the system uses time as the unit of measurement for providing to the user information regarding how much work would be lost if a particular unit of work were paused. For example, if a user requests to pause a particular segment on a service node, the system would provide resumption data regarding how many minutes of spent processing time would be surrendered at the target level if the segment were to be paused and resumed.

Figure 5:
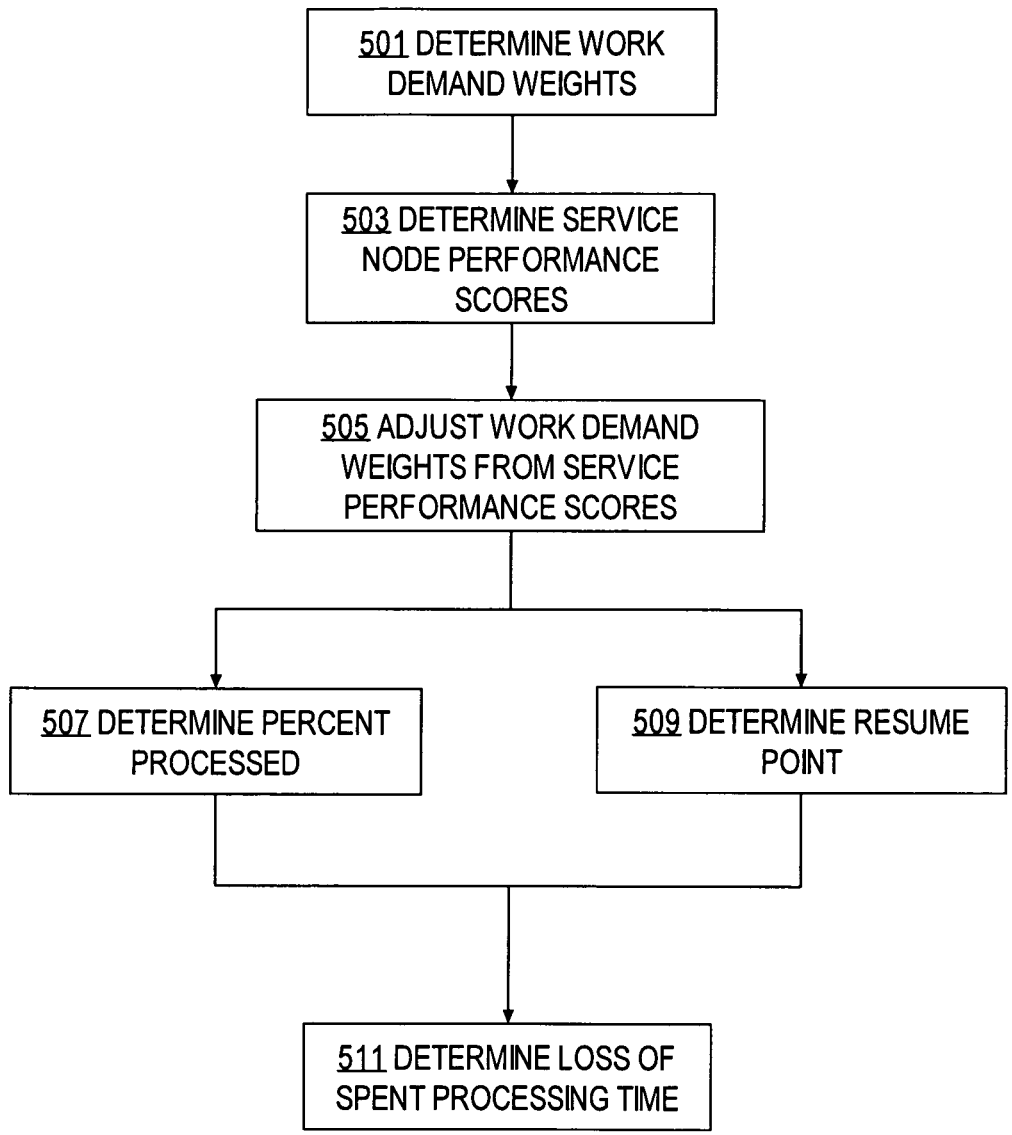
FIG. 5 is a flow diagram illustrating how the distributed system determines resumption data for a particular target, job (i.e. all targets produced by a particular source file), or a batch of jobs, according to one embodiment of the invention.

FIG. 5 is a flow diagram illustrating how the distributed system determines resumption data for a particular target, job (i.e. all targets produced by a particular source file), or a batch of jobs, according to one embodiment of the invention. At step 501, a work demand weight is determined for each unit. In the embodiment, a work demand weight is a number that is correlated with the amount of resources required for processing a particular piece of work, relative to other pieces of work. For example, a piece of work that has a work demand weight of 3 requires three times as many resources to process as another piece of work with a work demand weight of 1. According to one embodiment, the work demand weight is first determined for each target by the client application that submitted the processing request. The work demand weights for each segment are derived from the target's work demand weight, based on the size of each segment. The work demand weights for each job is the sum of all the targets' respective work demand weights. The work demand weight for each batch is the sum of the all the jobs' respective work demand weights.

At step 503, a performance score is determined for each of service nodes 107-112. Similar to the work demand weights, a performance score, according to one embodiment of the invention, is a relative value that compares the performance of one service node with another service node. According to one embodiment of the invention, performance scores for service nodes are determined by monitoring past processing of work by each of the service nodes. According to another embodiment, performance scores are re-calibrated as needed based on the service nodes' actual performance.

At step 505, as each target is being processed, the work demand weights for any unprocessed segments are adjusted, or re-calibrated, based on actual processing performance data that is collected from each of the service nodes. According to one embodiment, an average is taken from actual processing performance data of all segments of a batch to determine a factor by which to adjust the work demand weights for each segment of a target. The work demand weights of all segments of the batch that have not yet begun processing are adjusted by the adjustment factor.

At step 507, the completion percentage is determined at each of the batch, job, target, and segment levels. According to one embodiment, the actual percentage completed of any particular segment is periodically reported by each service to the cluster controller. In another embodiment of the invention, the cluster controller requests completion information for segments associated with a particular target or job from each of the services. According to the embodiment, the cluster controller can request and receive the completion information periodically.

The completion percentages for all the segments associated with a particular target are used to determine the completion percentage of the target. According to one embodiment, a weighted-average of the completion percentages of all the segments is used to determine the completion percentage of the target. For example, a particular target is divided into five segments for processing, and not all the segments have equal work demand weights. A segment scaler is determined for each segment based on a particular segment's work demand weight relative to the work demand weight for the target. For example, if the work demand weight for the target is 50, and a particular segment of the five segments has a work demand weight of 11, then the particular segment's scaler is 11÷50=0.22. The segment's completion percentage is multiplied by the scaler of 0.22 in order to determine the segment's scaled completion percentage. The target's completion percentage is the sum of all the scaled completion percentages of all the segments of the target. The job and batch completion percentages are likewise derived from the target and job completion percentages, respectively.

At step 509, the resumption point for a particular segment is determined by each service node for the particular segment. The resumption point reflects the completed work, or the processed data, that can be saved and would not need to be re-generated if the processing were paused for the segment. Thus, the resumption point reflects the point in the source file at which the service node can resume processing of a paused segment. Certain applications are able to save the state of a partially-processed segment. Certain applications are able to save the state of only full-processed segments. Certain applications cannot save segment states at all. Such applications require all segments of the target be processed without pausing; thus, pausing such targets effectively stops their processing. According to one embodiment, finalized data are processed data that can be saved and would not need to be re-generated if the processing were paused for the segment.

According to one embodiment, the resumption point for a particular segment, job, or batch is presented to the user in batch monitor 300 as a percentage. For example, a segment that comprises five frames of data, which is paused in the middle of the fourth frame, and can be resumed at the beginning of the fourth frame, has a completion percentage of 70%, and a resumption point of 60%, assuming that all the frames in the segment are of equal size.

Resumption points for targets, jobs, and batches, much like in determining completion percentages, are determined relative to the segment's work demand weight and the resumption point. According to one embodiment of the invention, the resumption point for a particular target is scaled according to the scaler as used in determining the completion percentages. The job and batch resumption points are likewise derived from the target and job resumption points, respectively.

At step 511, according to one embodiment of the invention, the system determines a measure of the completed work that would be lost based on the difference between the completion percentage and the resumption point of a particular segment. According to one embodiment, the lost work is expressed as a percentage of the total work required for processing the complete job. According to another embodiment, the lost work is expressed as the duration of spent or elapsed processing time that would be lost if the processing for the segment were paused. In one embodiment, the total elapsed time for processing the segment is used to determine the processing time that would be lost if the processing for the segment were paused. To determine the lost time, the elapsed time is multiplied by the proportion of work lost, relative to the work completed on the segment. In other words, $t_{lost}=t_{elapsed} \times \%_{lost} \div \%_{completed}$. According to one embodiment, if the lost work or lost time is less than a certain low threshold amount, then the time is not reported to the user as lost time at step 418.

Hardware Overview

Figure 6:
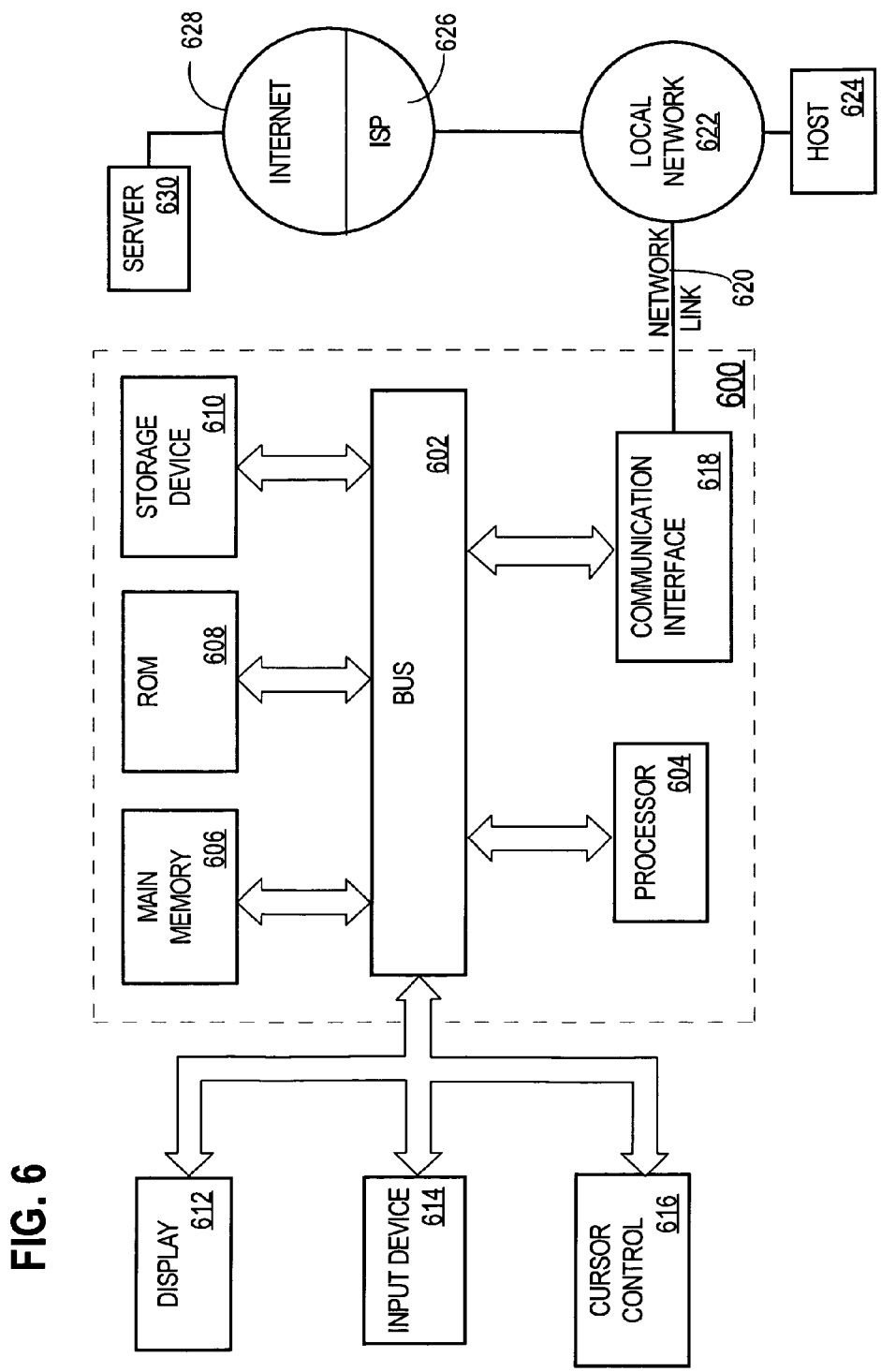
FIG. 6. is a block diagram illustrating a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing a computing job in a distributed processing system, the method comprising:
   receiving a request to process source data at a distributed processing system;
   causing the source data to be divided into a first plurality of segments of data;
   assigning each segment of data of the first plurality of segments of data to one of a plurality of services for processing;
   receiving progress data from each service that is processing each segment of data, wherein progress data reflects work that has been performed by the service as a percentage of total work to be performed by the service for processing the segment of data;
   receiving, from each service that is processing each segment of data, resumption data that reflects a measure of processed data, less than the total amount of processed data for the segment of data, that would require re-processing if the processing by the service were paused and resumed;
   determining a measure of total completed work that would be lost based on a difference between the progress data and the resumption data received from each service; and
   causing the measure of total completed work that would be lost to be displayed;
   wherein the steps of the method are performed by one or more computing devices.

2. The computer implemented method of claim 1, wherein the resumption data is at least one of:
   a duration of spent processing time that is lost when the processing of the segment of data is paused, then resumed;
   a proportion of the segment of data that is processed and savable when processing is paused; and a difference between the proportion of the segment of data that is processed and savable, and a proportion of the segment of data that is processed, when the processing is paused, then resumed.

3. The computer-implemented method of claim 1, further comprising communicating the resumption data to the user in response to receiving a request to pause the processing of the first plurality of segments of data.

4. The computer-implemented method of claim 1, further comprising communicating the resumption data to the user in response to receiving a request for the resumption data.

5. The computer-implemented method of claim 1, further comprising:
   determining resumption data for the first plurality of segments of data based on the resumption data for each of the segments of data; and
   communicating the resumption data for the first plurality of segments of data to a user.

6. The computer-implemented method of claim 5, further comprising:
   after the step of communicating the resumption data to the user, receiving a confirmation to pause the processing of the first plurality of segments of data;
   based on the confirmation, saving state data for each of the segments of data in a computer-readable storage medium; and
   terminating processing of the first plurality of segments of data.

7. The computer-implemented method of claim 6, wherein the state data includes data that reflects finalized work that was performed by the service.

8. The computer-implemented method of claim 6, further comprising:
   receiving a request to resume the processing of the first plurality of segments of data, wherein the first plurality of segments of data has state data that are saved in a computer-readable medium;
   locating the state data for each of the plurality of segments of data on the computer-readable storage medium;
   assigning each segment of data of the first plurality of segments of data and an associated state data to one of a plurality of services for processing;
   receiving resumption data from each service that is processing each segment of data; and
   determining resumption data for the first plurality of segments of data based on the resumption data for each of the segments of data.

9. The computer-implemented method of claim 8, further comprising:
   before assigning a segment of data to one of the plurality of services, further dividing the segment of data into two or more segments of data.

10. The computer-implemented method of claim 1, wherein the first plurality of segments of data constitute a first target of the source data.

11. The computer-implemented method of claim 10, wherein the first target and a second target constitute a job, and wherein one or more jobs constitute a batch of jobs.

12. The computer-implemented method of claim 11, wherein resumption data for a target is determined from resumption data for the first plurality of segments of data, wherein resumption data for a job is determined from resumption data for one or more targets that constitute the job, and resumption data for a batch of jobs is determined from resumption data for one or more jobs that constitute the batch.

13. The computer-implemented method of claim 1, further comprising:
   causing the source data to be divided into a second plurality of segments of data that is different from the first plurality of segments of data; and
   assigning a segment of data of the second plurality of segments of data to one of the plurality of services for processing;
   wherein the second plurality of segments of data constitute a second target of the source data.

14. The computer-implemented method of claim 1, further comprising:
   determining progress data for the first plurality of segments of data based on the progress data for each of the segments of data in the first plurality of segments of data; and
   communicating the progress data for the first plurality of segments of data to a user.

15. The computer-implemented method of claim 1, further comprising:
   before assigning a segment of data to a first service, selecting the first service based on:
   a performance score for the first service; and
   a work demand weight for the segment of data.

16. The computer-implemented method of claim 1, further comprising:
   after dividing the source data into the plurality of segments of data, saving the plurality of segments of data into a queue before assigning the segment of data.

17. The method of claim 1, wherein resumption data reflects an estimate.

18. The computer-implemented method of claim 1, wherein determining resumption data for the first plurality of segments of data further comprises:
   determining a performance score for each of the services that is processing one of the segments of data; and
   determining a work demand weight for each of the segments of data that is being processed.

19. The computer-implemented method of claim 18, wherein a work demand weight for the first plurality of segments of data is the sum of all the work demand weights for each of the segments of data.

20. A non-transitory computer-readable medium storing instructions which, when processed by one or more processors, cause:
   receiving a request to process source data at a distributed processing system;
   causing the source data to be divided into a first plurality of segments of data;
   assigning each segment of data of the first plurality of segments of data to one of a plurality of services for processing;
   receiving progress data from each service that is processing each segment of data, wherein progress data reflects work that has been performed by the service as a percentage of total work to be performed by the service for processing the segment of data;
   receiving, from each service that is processing each segment of data, resumption data that reflects a measure of processed data, less than the total amount of processed data for the segment of data, that would require re-processing if the processing by the service were paused and resumed;
   determining a measure of total completed work that would be lost based on a difference between the progress data and the resumption data received from each service; and causing the measure of total completed work that would be lost to be displayed.

21. The non-transitory computer-readable medium of claim 20, wherein the resumption data is at least one of:
a duration of spent processing time that is lost when the processing of the segment of data is paused, then resumed;
a proportion of the segment of data that is processed and savable when processing is paused; and
a difference between the proportion of the segment of data that is processed and savable, and a proportion of the segment of data that is processed, when the processing is paused, then resumed.

22. The non-transitory computer-readable medium of claim 20, further storing additional instructions which, when processed by the one or more processors cause:
communicating the resumption data to the user in response to receiving a request to pause the processing of the first plurality of segments of data.

23. The non-transitory computer-readable medium of claim 20, further storing additional instructions which, when processed by one or more processors, cause:
communicating the resumption data to the user in response to receiving a request for the resumption data.

24. The non-transitory computer-readable medium of claim 20, further storing additional instructions which, when processed by the one or more processors, cause:
determining resumption data for the first plurality of segments of data based on the resumption data for each of the segments of data; and communicating the resumption data for the first plurality of segments of data to a user.

25. The non-transitory computer-readable medium of claim 24, further storing additional instructions which, when processed by the one or more processors, cause:
after the step of communicating the resumption data to the user, receiving a confirmation to pause the processing of the first plurality of segments of data;
based on the confirmation, saving state data for each of the segments of data in a computer-readable storage medium; and
terminating processing of the first plurality of segments of data.

26. The non-transitory computer-readable storage medium of claim 25, wherein the state data includes data that reflects finalized work that was performed by the service.

27. The non-transitory computer-readable medium of claim 25, further storing additional instructions which, when processed by the one or more processors, cause:
receiving a request to resume the processing of the first plurality of segments of data, wherein the first plurality of segments of data has state data that are saved in a computer-readable medium;
locating the state data for each of the plurality of segments of data on the computer-readable storage medium;
assigning each segment of data of the first plurality of segments of data and an associated state data to one of a plurality of services for processing;
receiving resumption data from each service that is processing each segment of data; and
determining resumption data for the first plurality of segments of data based on the resumption data for each of the segments of data.

28. The non-transitory computer-readable medium of claim 27, further storing additional instructions which, when processed by the one or more processors, cause:
before assigning a segment of data to one of the plurality of services, further dividing the segment into two or more segments of data.

29. The non-transitory computer-readable medium of claim 20, wherein the first plurality of segments of data constitute a first target of the source data.

30. The non-transitory computer-readable medium of claim 29, wherein the first target and a second target constitute a job, and wherein one or more jobs constitute a batch of jobs.

31. The non-transitory computer-readable medium of claim 30, wherein resumption data for a target is determined from resumption data for the first plurality of segments, wherein resumption data for a job is determined from resumption data for one or more targets that constitute the job, and resumption data for a batch of jobs is determined from resumption data for one or more jobs that constitute the batch.

32. The non-transitory computer-readable medium of claim 20, further storing additional instructions which, when processed by the one or more processors, cause:
causing the source data to be divided into a second plurality of segments of data that is different from the first plurality of segments of data; and
assigning a segment of data of the second plurality of segments of data to one of the plurality of services for processing;
wherein the second plurality of segments of data constitute a second target of the source data.

33. The non-transitory computer-readable medium of claim 20, further storing additional instructions which, when processed by the one or more processors, cause:
determining progress data for the first plurality of segments of data based on the progress data for each of the segments of data in the first plurality of segments of data; and
communicating the progress data for the first plurality of segments of data to a user.

34. The non-transitory computer-readable medium product of claim 20, further storing additional instructions which, when processed by the one or more processors, cause:
before assigning a segment of data to a first service, selecting the first service based on:
a performance score for the first service; and
a work demand weight for the segment of data.

35. The non-transitory computer-readable medium product of claim 20, further storing additional instructions which, when processed by the one or more processors, cause:
after dividing the source data into the plurality of segments of data, saving the plurality of segments of data into a queue before assigning the segment of data.

36. The non-transitory computer-readable medium of claim 20, wherein resumption data reflects an estimate.

37. The non-transitory computer-readable medium of claim 20, further storing additional instructions which, when processed by the one or more processors, cause:
determining a performance score for each of the services that is processing one of the segments of data; and
determining a work demand weight for each of the segments of data that is being processed.

38. The non-transitory computer-readable medium of claim 37, wherein a work demand weight for the first plurality of segments of data is the sum of all the work demand weights for each of the segments of data.

39. A system configured as a distributed processing system, the system comprising:

a cluster controller including a processor and a memory coupled to the processor, wherein said cluster controller is configured to perform:

receiving a request to process source data at a distributed processing system;

causing the source data to be divided into a first plurality of segments of data;

assigning each segment of data of the first plurality of segments of data to one of a plurality of services for processing;

receiving progress data from each service that is processing each segment of data, wherein progress data reflects work that has been performed by the service as a percentage of total work to be performed by the service for processing the segment of data;

receiving, from each service that is processing each segment of data, resumption data that reflects a measure of processed data, less than the total amount of processed data for the segment of data, that would require re-processing if the processing by the service were paused and resumed;

determining a measure of total completed work that would be lost based on a difference between the progress data and the resumption data received from each service; and causing the measure of total completed work that would be lost to be displayed; and a plurality of service nodes, wherein each service node includes a processor and a memory coupled to the processor, wherein each of the plurality of service nodes is coupled to the cluster controller, and wherein each of said plurality of service nodes is configured to process at least one of the plurality of segments of data.

40. The system of claim 39, wherein the resumption data is at least one of:
a duration of spent processing time that is lost when the processing of the segment of data is paused, then resumed;
a proportion of the segment of data that is processed and savable when processing is paused; and
a difference between the proportion of the segment of data that is processed and savable, and the proportion of a segment of data that is processed, when the processing is paused, then resumed.

41. The system of claim 39, wherein said cluster controller is further configured to perform:
communicating the resumption data to the user in response to receiving a request to pause the processing of the first plurality of segments of data.

42. The system of claim 39, wherein said cluster controller is further configured to perform:
communicating the resumption data to the user in response to receiving a request for the resumption data.

43. The system of claim 39, wherein said cluster controller is further configured to cause:
determining resumption data for the first plurality of segments of data based on the resumption data for each of the segments of data; and
communicating the resumption data for the first plurality of segments of data to a user.

44. The system of claim 43, wherein said cluster controller is further configured to cause:
after the step of communicating the resumption data to the user, receiving a confirmation to pause the processing of the first plurality of segments of data;
based on the confirmation, saving state data for each of the segments of data in a computer-readable storage medium; and
terminating processing of the first plurality of segments of data.

45. The system of claim 44, wherein the state data includes data that reflects finalized work that was performed by the service.

46. The system of claim 44, wherein said cluster controller is further configured to cause:
receiving a request to resume the processing of the first plurality of segments of data, wherein the first plurality of segments of data has state data that are saved in a computer-readable medium;
locating the state data for each of the plurality of segments of data on the computer-readable storage medium;
assigning each segment of data of the first plurality of segments of data and an associated state data to one of a plurality of services for processing;
receiving resumption data from each service that is processing each segment of data; and
determining resumption data for the first plurality of segments of data based on the resumption data for each of the segments of data.

47. The system of claim 46, wherein said cluster controller is further configured to cause:
before assigning a segment of data to one of the plurality of services, further dividing the segment of data into two or more segments of data.

48. The system of claim 39, wherein the first plurality of segments of data constitute a first target of the source data.

49. The system of claim 48, wherein the first target and a second target constitute a job, and wherein one or more jobs constitute a batch of jobs.

50. The system of claim 49, wherein resumption data for a target is determined from resumption data for the first plurality of segments of data, wherein resumption data for a job is determined from resumption data for one or more targets that constitute the job, and resumption data for a batch of jobs is determined from resumption data for one or more jobs that constitute the batch.

51. The system of claim 39, wherein said cluster controller is further configured to cause:
causing the source data to be divided into a second plurality of segments of data that is different from the first plurality of segments of data; and
assigning a segment of data of the second plurality of segments of data to one of the plurality of services for processing;
wherein the second plurality of segments of data constitute a second target of the source data.

52. The system of claim 39, wherein said cluster controller is further configured to cause:
determining progress data for the first plurality of segments of data based on the progress data for each of the segments of data in the first plurality of segments of data; and
communicating the progress data for the first plurality of segments of data to a user.

53. The system of claim 39, wherein said cluster controller is further configured to cause:
before assigning a segment of data to a first service, selecting the first service based on:
a performance score for the first service; and
a work demand weight for the segment of data.

54. The system of claim 39, wherein said cluster controller is further configured to cause:

after dividing the source data into the plurality of segments of data, saving the plurality of segments of data into a queue before assigning the segment of data.

55. The system of claim 39, wherein resumption data reflects an estimate.

56. The system of claim 39, wherein determining resumption data for the first plurality of segments of data further comprises:
   determining a performance score for each of the services that is processing one of the segments of data; and
   determining a work demand weight for each of the segments of data that is being processed.

57. the system of claim 56, wherein a work demand weight for the first plurality of segments of data is the sum of all the work demand weights for each of the segments of data.

* * * * *